Patented Oct. 9, 1951

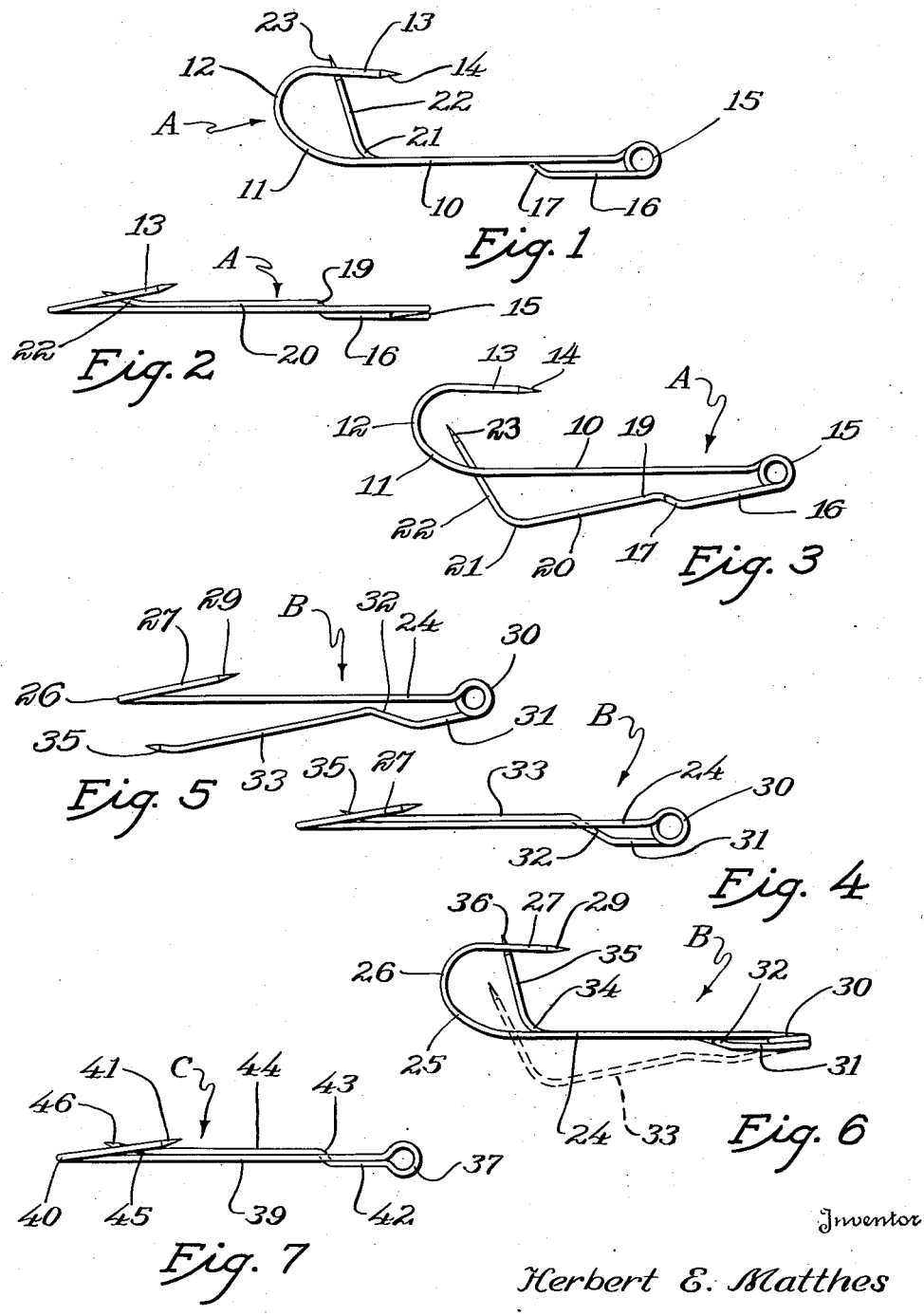

2,570,468

UNITED STATES PATENT OFFICE 2,570,468

FISHHOOK

Herbert E. Matthes, St. Paul, Minn.

Application January 7, 1949, Serial No. 69,717

3 Claims. (Cl. 43—43.4)

My invention relates to an improvement in fish hooks wherein it is desired to provide a hook which will be effective in catching fish and yet which may be more easily dislodged from the mouth of the fish than barbed hooks.

A great many fish are caught that are too small, under the size limit, or those that may be out of season, and these fish must be released. It is the purpose of the invention to provide a hook that may be removed from the fish without inflicting serious injury, contributed to the difficulty in removal of the hook. Furthermore, it is my purpose to provide a hook without the use of a barb that will retain the fish as well as the bait, and also be adaptable for use as a flyhook.

A feature of the present invention lies in the provision of a hook of a shape generally similar to that of a conventional hook, but which preferably has no barb at its pointed end. The shank of the hook is connected to a hook guard by means of a spring connection at the supporting end of the hook shank. This guard extends generally parallel to the hook shank for a portion of its length and is then bent to extend across the rounded end of the hook to bridge this hook end. The spring connection between the hook shank and the guard permits the guard to be retracted or flexed as the fish bites the bait upon the hook. The guard is provided with a pointed end which permits the fish to engage the rounded end of the hook, but which prevents removal of the fish from the hook. As a result the fish is effectively engaged on the hook.

A feature of the present invention lies in the fact that the guard extends at an angle pointing toward the rounded end of the hook so that movement of the mouth of the fish into the hook acts to flex the guard rearwardly while movement toward the point of the hook and away from the rounded end causes the guard to engage into the jaw or mouth of the fish. Thus the fish is securely held from disengagement.

An added feature of the present invention lies in the fact that while the guard prevents accidental disengagement of the mouth of the fish from the hook, at the same time the guard may be easily flexed out of engagement with the fish so that the fish may be easily disengaged from the hook without serious injury to the fish.

A feature of the present invention resides in the fact that the guard tends to decrease the extent to which the fish swallows the hook. As the guard is flexed rearwardly by the mouth of the fish, the width of the hook is increased which tends to lessen the distance to which the hook is swallowed. As a result my hook provides less injury to the fish than hooks of usual types.

A feature of the present invention lies in the fact that my guard tends to prevent loss of bait from the hook. The bait may be impaled either upon the hook proper or upon the pointed guard. If supported by the body of the hook, it is threaded to a point near or on the rounded end of the hook and accidental disengagement of the bait is prevented by the guard which contacts under spring tension both the shank of the hook and the pointed extermity thereof. As the bait is threaded upon the guard it is threaded between the shank of the hook and the pointed extermity thereof and the body of the hook prevents the disengagement of the bait from the guard.

A further feature of the present invention resides in the provision of a hook having a hook body and a guard connected by suitable spring means and in spacing a portion of the parallel shanks of the hook and guard so as to permit the insertion of a portion of the fingers or a suitable tool between the two shanks. As a result the guard may be grasped more easily and may be flexed out of normal position with relative ease.

These and other objects and novel features of my invention will be more clearly and fully set forth in the following specification and claims.

In the drawings forming a part of my specification:

Figure 1 is a side elevational view of my fish hook showing the construction thereof.

Figure 2 is a top plan view of the fish hook illustrated in Figure 1.

Figure 3 is a view similar to Figure 1 showing the position of the guard as the guard is flexed.

Figure 4 is a top plan view of a modified form of hook construction.

Figure 5 is a view similar to Figure 4 showing the shape of the hook and guard before the guard is flexed into operative position.

Figure 6 is a side elevational view of the hook shown in Figures 4 and 5, this figure showing in dotted outline the partially flexed position of the guard.

Figure 7 is a top plan view of another modified form of hook construction.

The fish hook A illustrated in Figures 1 through 3 of the drawings includes an elongated hook shank 10 which is curved at 11 to form a rounded hook end 12 which continues into a relatively straight extremity 13 having a pointed end 14. The exact shape of the hook is not of utmost importance in the present invention and the rounded end may comprise a continuous arc, may be shaped at best shown in Figures 1 and 3, or may be bent in relatively sharp bends to produce a squarer type end. For the purpose of description this end of the hook has been described as the rounded end so as to distinguish from the opposite end by which the hook is supported. Furthermore, it will be understood that the relatively straight extremity 13 may be shorter or longer than is illustrated and may be either in the plane of the shank 10 and curved part 11 or may be bent to one side of the plane of the shank as shown in Figure 2 of the drawings.

The shank 10 is provided at its extremity with a coil 15 which in preferred form comprises slightly less than two complete convolutions. In the form illustrated the coil or spring 15 is integral with the shank 11 for simplicity of manufacture and economy of production. However, if desired the spring 15 may comprise a separate element secured to the hook shank.

The wire forming the coil or attached thereto continues approximately tangentially from the coil 15 to provide a spaced parallel guard shank end 16. The shank end 16 is bent upwardly at 17 toward the horizontal plane through the hook shank 10 in the hook position illustrated in Figure 1 and then bends laterally as best indicated at 19 in Figure 2 of the drawings to extend beneath the hook shank 10. The guard includes a shank 20 which extends parallel to and closely adjacent the shank 10 to a point near the curved end of the hook. The guard shank 20 then is bent at 21 to provide a substantially straight guard portion 22 equipped with a pointed end 23.

It is important to note that the end 22 near the pointed end 23 engages against the side of the hook near the pointed end 14 thereof. The distance between the pointed end 14 of the hook and the pointed end 23 of the guard may be decreased considerably from the distance shown in Figure 1 of the drawings without changing the spirit of the invention. In the embodiment illustrated a short portion of the hook end extends beyond the guard so that the fish may partially enter the hook without engaging the guard 22. However, the shank 20 of the guard may be shortened so that the pointed end 23 of the guard is substantially closer to the point of the hook if desired.

The arrangement illustrated is such that as the guard is flexed as illustrated in Figure 3 of the drawings, the point of the hook is located between the end portion 13 of the hook and the shank 10 thereof. The hook during its formation is bent so that the shank 20 of the guard is urged under spring tension toward the shank 10 of the hook. As a result the flexing of the guard as indicated in Figure 3 causes the end portion 22 of the guard to bear against the shank 10 on the curved part 11 of the hook under slight spring tension. As a result a constant spring pressure is exerted against the body of the hook by the guard. This arrangement prevents loss of the bait accidentally whether the bait is mounted upon the rounded end of the hook or upon the end of the guard.

The spring coil 15 also urges the laterally extending portion 19 of the hook against the hook shank 10, thereby limiting the pivotal movement of the hook shank in one direction. The guard portion 19 serves as a stop to hold the shank 10 and the guard shank 20 in parallel adjacent relation under normal circumstances, but permits the free rearward flexing of the guard as shown in Figure 3.

It will be seen that as the fish takes the bait the pointed end 14 of the hook tends to pass through the jaw of the fish adjacent the mouth and the spring guard is retracted by the jaw of the fish. The pointed end 23 of the guard thus engages the body of the fish and prevents the engaged portion of the fish from sliding in a reverse direction toward the point of the hook. In other words as the fish engages the hook, the slant of the guard tends to open the guard while a reverse movement tends to cause the pointed end 23 of the guard to dig into the fish and serve somewhat in the capacity of a barb.

In order to remove the fish from the hook the guard shank is flexed into open position by engagement of the fingers with the shank 10 and spaced shank portion 16 of the guard or by insertion of a tool between the shank 10 and the guard shank portion 16. When flexed in this manner the engaged portion of the fish may be readily disengaged from the hook.

In Figures 4 through 6 of the drawings I have disclosed a modified form of hook B which is very similar to the hook A. The hook B differs from the hook A mainly in the fact that the axis of the convolute spring coil connecting the hook shank to the guard is substantially in the plane of the hook shank rather than normal thereto as in the hook B.

The hook B includes a hook shank 24 which is curved at 25 to form a rounded end 26. The rounded end 26 usually is provided with a generally straight extremity 27 having a pointed end 29.

The shank 24 is connected to one end of a convolute coil 30 which preferably comprises slightly less than two complete convolutions. The coil 30 connects the hook shank 24 to a parallel shank portion 31 forming a part of the guard.

The shank portion 31 extends in spaced parallel relation to the shank 24 for a short distance and is connected by a laterally extending portion 32 to the guard shank portion 33. The guard shank portion 33 extends in substantially parallel adjacent relation to the hook shank 24 and is bent at 34 into the angularly extending extremity 35. The extremity 35 is provided with a pointed tip 36 which is in contacting relation to the end portion 27 of the hook near the pointed end 29 thereof.

The coil spring 30 tends to produce a spring pressure in two different directions when the hook is in readiness for use. As shown in Figure 5 of the drawings the hook B normally tends to spring into the position shown in Figure 5 of the drawings in which the shank of the guard extends angularly with respect to the hook shank 24. By flexing the guard shank 33 to extend on the opposite side of the hook shank 24 from that on which it appears in Figure 5, the guard shank is urged against the hook shank and the angularly extending guard end 35 is resiliently urged against the body of the hook.

The spring 30 also tends to urge the laterally extending portion 32 of the hook against the undersurface of the hook shank, engagement with the hook shank limiting the movement of the guard and holding the guard shank 33 in parallel adjacent relation to the hook shank 24. Thus the guard always tends to remain under spring tension in the position shown in full lines in Figures 4 and 6 of the drawings unless flexed out of this position.

In Figure 7 of the drawings I disclose a modified form of hook C which differs from the hook A or B mainly in the fact that the connecting spring comprises merely a spring loop rather than more than one complete convolution. The spring loop 37 of the hook C may have its axis either in the plane of the hook shank as in the hook B or normal to the plane of the hook shank as in the hook A.

The spring loop 37 is connected at one end to the hook shank 39 which is bent to provide a rounded hook end 40 which terminates in a hook point 41. The other end of the loop 37 is connected to the guard shank portion 42 which is connected by a laterally extending connection 43 to the shank portion 44. The guard shank portion 44 terminates in an upwardly inclined extremity 45 having a pointed end 46 which is normally resiliently urged against the body of the hook. The guard extremity 45 bridges the rounded end of the hook as in the previously described hook portions.

It will be noted that in this construction the shank portion 42 may either be in spaced parallel relation to the hook shank 36 or in parallel contacting relation thereto. The guard shank portion 44 is preferably spring urged into parallel adjacent relation to the hook shank 39. The off-set 43 tends to limit the swinging movement of the guard in one direction as in the previously described constructions.

The hook C has the advantage of simplicity and low cost of construction. On the other hand, this type of hook has the disadvantage that the loop end 37 might possibly become disengaged from the supporting line and that the spring provided by the single loop is somewhat limited. The construction shown in Figure 7 is usually preferable for small hooks where small diameter wire is used in the formation.

In accordance with the patent statutes, I have described the principles of construction and operation of my fish hook construction, and while I have endeavored to set forth the best embodiments thereof, I desire to have it understood that obvious changes may be made within the scope of the following claims without departing from the spirit of my invention.

I claim:

1. A fish hook comprising a hook element including a hook shank and a hook end thereon terminating in a pointed hook end, a spring coil at the opposite end of the hook shank from the hook end, the spring coil being arranged on an axis substantially normal to a plane including the hook shank, a guard connected to the opposite end of the coil, said guard including a guard shank end extending in substantially parallel spaced relation to the hook shank for a short distance from said coil, a guard shank portion extending in parallel contacting relation to the hook shank, a laterally bent portion connecting said guard shank end and said guard shank portion, an angularly bent end on said guard shank portion inclining toward the closed end of the hook and normally bridging the hook end, and a pointed end on said angularly bent end, said guard swinging upon flexing of said spring coil to move the pointed end of the guard within the area defined by the hook end of the hook, said spring normally urging said guard against said hook shank and causing the shanks to diverge apart from said spring when disengaged.

2. A fish hook comprising a hook element including a hook shank and a hook end thereon terminating in a pointed hook end, a spring coil at the opposite end of the hook shank from the hook end, the spring coil having its axis substantially in the plane of the hook, a guard connected to the opposite end of the coil, said guard including a guard shank end extending in substantially parallel spaced relation to the hook shank for a short distance from said coil, a guard shank portion extending in parallel contacting relation to the hook shank, a laterally bent portion connecting with said guard shank end and said guard shank portion, an angularly bent end on said guard shank portion inclining toward the closed end of the hook and normally bridging the hook end, and a pointed end on said angularly bent end, said guard swinging upon flexing of said spring coil to move the pointed end of the guard within the area defined by the hook end of the hook, said spring normally urging said guard against said hook shank and causing the shanks to diverge apart from said spring when disengaged.

3. A single unit fish hook and guard device comprising a shank portion terminating at one end in a curved bill with a pointed extremity in a plane substantially parallel to the shank portion, the latter having an eye at its other end, said eye constituting resilient coil means having one end thereof merging into said shank portion and its other end merging into a second shank portion, the latter comprising two substantially straight parts and a third part at an angle thereto maintaining the straight parts in substantially parallel relation, one of said parts terminating in a guard prong of a length greater than the distance between the first shank portion and the pointed extremity of the curved bill, whereby the prong may be moved into engagement with a side of the pointed extremity of the curved bill while a part of the second shank portion immediately merging from the resilient coil means is on the opposite side of the first shank portion.

HERBERT E. MATTHES.

REFERENCES CITED

The following references are of record in the file of this patent:

UNITED STATES PATENTS

| Number | Name | Date |
|---|---|---|
| 675,853 | Edgar | June 4, 1901 |
| 1,869,293 | Wolford | July 26, 1932 |

FOREIGN PATENTS

| Number | Country | Date |
|---|---|---|
| 71,857 | Norway | Mar. 24, 1947 |